United States Patent [19]

Shealy

[11] 3,973,450
[45] Aug. 10, 1976

[54] DYNAMIC TOOTH CLUTCH

[75] Inventor: Noah Alvin Shealy, Niles, Mich.

[73] Assignee: Clark Equipment Company, Buchanan, Mich.

[22] Filed: Mar. 24, 1975

[21] Appl. No.: 561,520

[52] U.S. Cl. .............................. 74/710.5; 74/713
[51] Int. Cl.² .................... F16H 1/44; F16H 1/40
[58] Field of Search .......................... 74/710.5, 713

[56] References Cited
UNITED STATES PATENTS

| | | | |
|---|---|---|---|
| 1,888,884 | 11/1932 | Omer et al. ........................ | 74/713 |
| 2,304,914 | 12/1942 | Hibbett ............................. | 74/316 |
| 2,638,794 | 5/1953 | Knoblock .......................... | 74/650 |
| 2,803,149 | 8/1957 | Pringle ............................. | 74/710.5 |
| 3,146,842 | 9/1964 | Nelson et al. ..................... | 180/22 |
| 3,498,154 | 3/1970 | Müller-Berner .................. | 74/710.5 |
| 3,503,280 | 3/1970 | Bopp ................................ | 74/695 |
| 3,845,671 | 11/1974 | Sharp et al. ...................... | 74/710.5 |

Primary Examiner—Leonard H. Gerin
Attorney, Agent, or Firm—Ernst H. Ruf

[57] ABSTRACT

A dynamic tooth clutch interposed between two rotating members for coupling same includes a first collar slidably mounted on one of the members and has a plurality of equally angularly spaced axially extending radial first inner and outer teeth. A second collar is fixed to the other member and has a plurality of equally angularly spaced axially extending radial second outer teeth that are designed to intermesh with the first outer teeth and are so angularly spaced that when the first and second outer teeth are centered relative to one another there can be a first predetermined amount of bidirectional angular rotational movement therebetween before there is abutment of adjacent tooth side surfaces. A cam ring coacts with the second collar, with the cam ring being capable of a predetermined amount of bidirectional angular rotational movement relative to the second collar. The cam ring, which is preloaded and self-centered relative to the second collar, has a plurality of second inner teeth that are angularly aligned with the second outer teeth in the self-centered cam position, with the combined tooth depth of the first and second inner teeth being greater than the combined tooth depth of the first and second outer teeth, thus permitting axial end abutment of only the inner teeth in the absence of intermeshing. The force for displacing the first collar toward the second collar is less than the centering force on the cam ring thus permitting direct meshing of the first and second inner teeth but only complete centered axial meshing of the first and second outer teeth prior to the angular displacement of the cam ring relative to the second collar, thereby allowing full axial intermeshing of the first and second outer teeth before there is abutment and subsequent torque transfer between the outer teeth.

21 Claims, 7 Drawing Figures

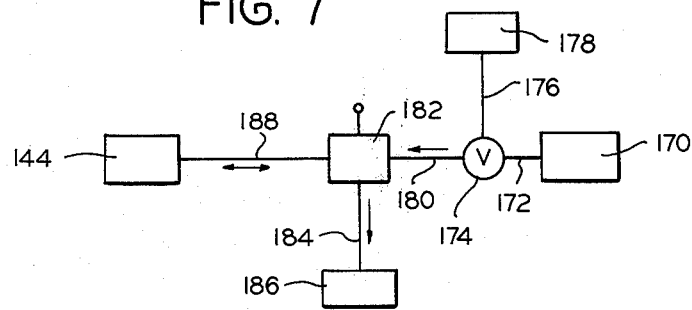
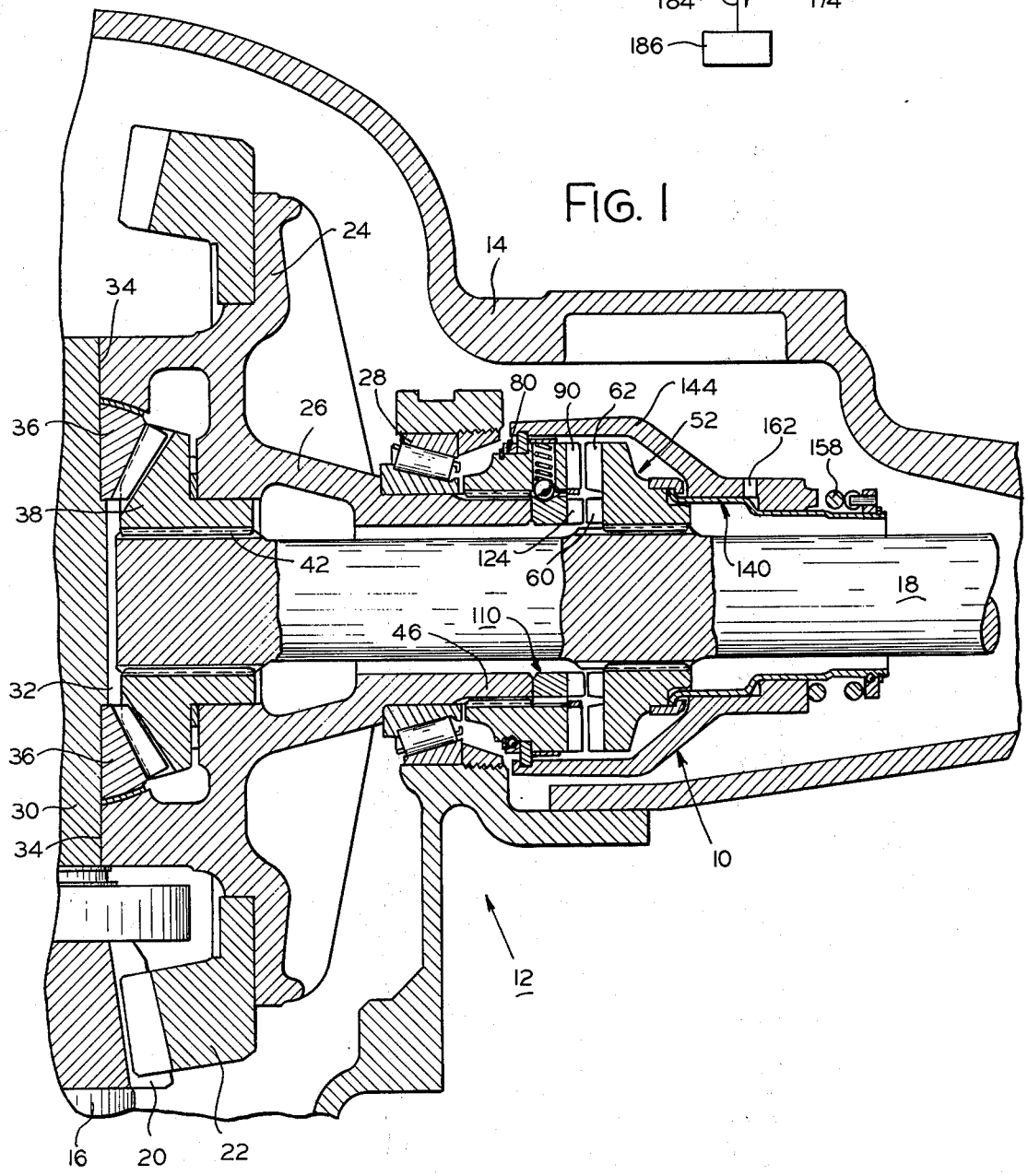

DYNAMIC TOOTH CLUTCH

BACKGROUND OF THE INVENTION

1. Field of the Invention

The present invention relates to a dynamic tooth clutch interposed between a rotating first member, operating at a first speed, and a rotating second member operating at a second speed. This invention may be utilized, for example, as a differential lock structure in a differential mechanism. The dynamic tooth clutch, by having one of its toothed portions attached to an axle shaft and the other of its toothed portions attached to the differential carrier, by utilizing the novel cam ring of this invention permits shock free coupling of the axle shaft and the differential carrier up to a predetermined speed difference therebetween.

2. Description of the Prior Art

The prior art is replete with locking differential structures, examples thereof being shown in U.S. Pat. No. 1,888,884 to Omer et al., U.S. Pat. No. 2,304,914 to Hibbett, U.S. Pat. No. 2,803,149 to Pringle, U.S. Pat. No. 2,876,658 to McColl and U.S. Pat. No. 3,498,154 to Mueller-Berner, with many of these structures utilizing jaw-type or toothed-type clutches. While these prior art structures tend to perform quite satisfactorily, a problem has remained in that the use of tooth type clutches generally requires that the engaging and disengaging sequences are preferably performed while the vehicle is at rest since the lack of synchronizer mechanisms causes clashing during dynamic conditions. In addition, if there is but partial axial engagement between the opposing clutch teeth, extremely high tooth shock loadings as well as possible tooth shear can result. Such partial engagement between the clutch teeth can of course readily result since there may be a speed differential of several hundred rpm between the axle shaft and the differential carrier, for example.

SUMMARY OF THE INVENTION

The dynamic tooth clutch structure of this invention solves many of the previously-noted problems in that it utilizes a cam ring that is capable of a predetermined amount of bidirectional angular rotational movement relative to one of the clutch halves, with this angular displacement allowing full centered intermeshing of the main torque-transmitting teeth before there is abutment and subsequent torque transfer between either side surfaces of one of the sets of teeth with the adjacent side surfaces of the other set of teeth, thereby permitting substantially shock free coupling of the members to be coupled up to a predetermined difference between their respective speeds. It should of course be understood that the use of this dynamic tooth coupling is not restricted to differential mechanisms but can be utilized for coupling any two rotatable members.

In summary, the dynamic tooth clutch of this invention is interposed between rotating first and second members, operating at different speeds, with this tooth clutch basically utilizing first and second collars. The first collar is slidably mounted on one of the members and has a plurality of equally angular spaced axially extending radial first inner and outer teeth, with these first inner and outer teeth being angularly aligned. A second collar is affixed to the other member and has a plurality of equally angularly spaced axially extending radial second outer teeth that are substantially similar in size, location and angular spacing to the first outer teeth, with the first and second outer teeth being arranged to intermesh, but being so angularly spaced that upon initial intermeshing, when the first and second outer teeth are centered relative to one another, there can be a first predetermined amount of bidirectional angular rotational movement therebetween before either of the side surfaces of one of the first or second outer teeth abut the adjacent side surfaces of the other teeth.

A cam ring is confined against axial movement in the inner peripheral surface of the second collar, but complementary retaining means between the second collar and the cam ring permit a second predetermined amount of bidirectional angular rotational movement of the cam ring relative to the second collar. Preloaded and self-centering yieldable means are utilized for centering the cam ring relative to the second collar and for returning the cam ring to a center position, relative to the second collar, when the first and second outer teeth are disengaged.

The cam ring is also provided with a plurality of equally spaced axially extending second inner teeth, with these second inner teeth being angularly aligned with the second outer teeth when the cam ring is centered relative to the second collar. The second inner teeth are substantially similar in location and angular spacing to the first inner teeth and are arranged to intermesh therewith, with the combined tooth depth of the first and second inner teeth being greater than the combined tooth depth of the first and second outer teeth. Thus, when the first collar is axially displaced towards the second collar, the opposing axial end surfaces of the first and second inner teeth will abut, in the absence of intermeshing, while there is still clearance between the opposing axial end surfaces of the first and second outer teeth.

Means are provided for axially displacing the first collar relative to the second collar, with the force for displacing the first collar toward the second collar being less than that of the preloaded self-centering yieldable means, thus permitting direct meshing of the first and second inner teeth and complete centered intermeshing of the first and second outer teeth, prior to the angular displacement of the cam ring relative to the second collar. Thus, the angular displacement of the cam ring permits full axial intermeshing of the first and second outer teeth before there is abutment and subsequent torque transfer between either of the side surfaces of one of the first or second outer teeth with the adjacent side surfaces of the outer teeth. Therefore, the cam ring behaves as a synchronizer and permits substantially shock free coupling of the first and second members up to a predetermined difference between the first and second speeds.

When using the dynamic tooth clutch as a differential lock structure, the predetermined amounts of bidirectional angular movement preferably are about 5° and the predetermined speed difference between the first and second members is preferably below 200 rpm.

Fluid-pressure operated piston and cylinder means are utilized for axially displacing the first collar and there are control means for the piston and cylinder means. Speed differential sensing means may be utilized for sensing the speed differences between the two members, with the sensing means automatically shutting off the source of fluid pressure any time the speed differential between the members exceeds a predetermined amount.

Other features and advantages of the invention will become more readily understood by persons skilled in the art when following the detailed description in conjunction with the several drawings.

BRIEF DESCRIPTION OF THE DRAWINGS

FIG. 1 is a vertical sectional view of a portion of a differential mechanism that utilizes the dynamic tooth clutch of this invention.

FIG. 7 shows schematically the fluidic circuit and control means that could be utilized for the operation of the invention.

DESCRIPTION OF THE PREFERRED EMBODIMENT

Figure 2:
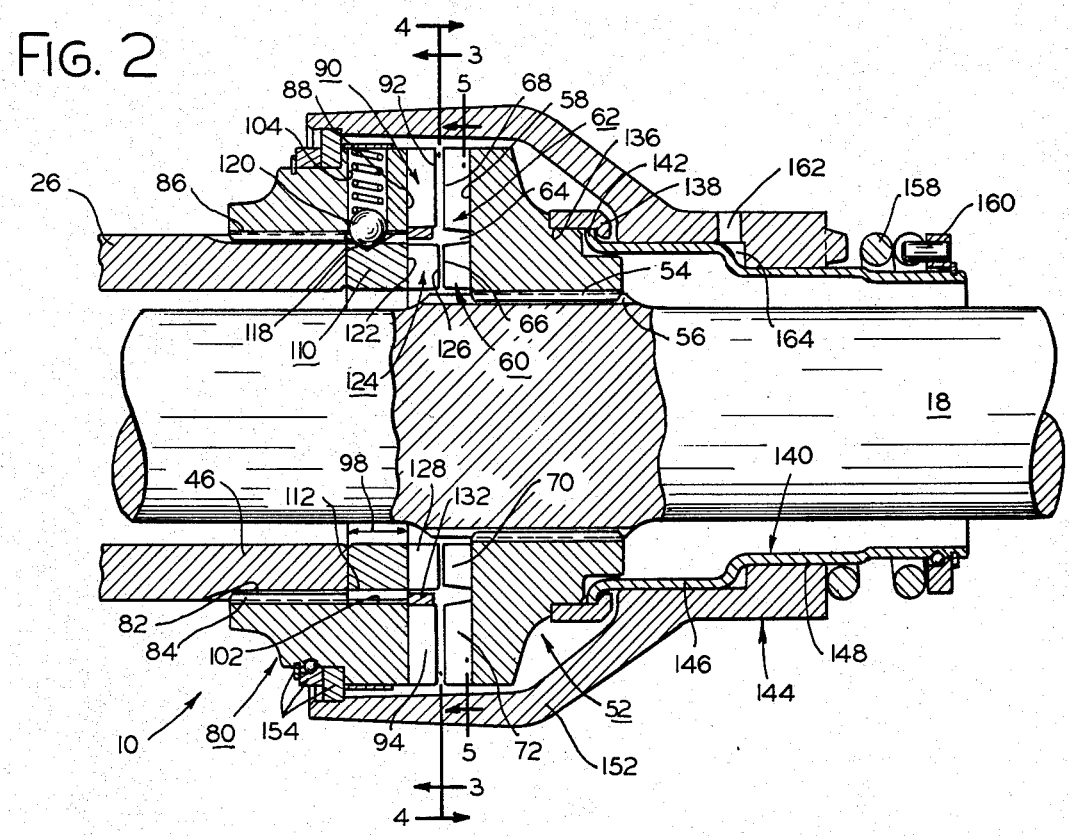
FIG. 2 is an enlarged portion of the dynamic tooth clutch of FIG. 1.

Referring now to the drawings, particularly FIG. 1, the dynamic tooth clutch of this invention, which is generally designated by the numeral 10, is shown as being utilized, for example, as a differential lock structure in a differential mechanism 12, of which only a portion is shown. Differential mechanism 12 includes a differential housing 14 which contains the various components of the differential and provides openings for an input shaft 16 and a pair of co-or axle shafts drive axles 18 (only one of which is shown). Input shaft 16 is rotatably journalled within differential housing 14 and has a drive pinion gear 20 affixed thereto for conjoint rotation therewith. A ring gear 22, driven by drive pinion 20, is connected to rotate a differential carrier 24, which includes differential carrier housing 26, about the axis of rotation defined by tapered thrust bearing 28 interposed between differential housing 14 and differential carrier housing 26.

Differential carrier 24 is hollow, generally closed, and carries a spider or cross 30 (only partially shown) having multiple shafts, each of which is diametrically disposed across the carrier cavity 32, with the ends of these cross shafts being received within diametrically opposed bores 34 formed in carrier 24 to fix the cross for rotation with the carrier.

Each shaft of cross 32, carries a pair of planetary pinion gears 36 (only partially shown), each of which engages a pair of side gears 38 (only one which is shown). Drive axles 18 extend into differential carrier 24 through axleways formed in the carrier co-axial with its axes of rotation, with axles 18 being splined, as at 42, for conjoint rotation with their respective side gears 38. It should be understood at this time that the portion of the differential that is not shown in FIG. 1 is substantially similar to the portion shown except for the deletion of ring gear 22 and dynamic tooth clutch 10.

In the normal operation of differential 12, which is well known, when axles 18 are operating at the same rotative speed, there is no relative rotation between differential carrier 24 and side gears 38, and, therefore, no relative rotation between differential carrier housing 26 and axles 18. However, if one of the axles 18 is permitted to turn more freely than the other, relative motion between its respective side gear and differential carrier 24 must occur so that now the relative rotational speed between differential carrier housing 26 and drive axle 18 varies.

If it is desired, for example, to achieve maximum traction, a known way to achieve maximum traction is to lock the differential in a manner so that the differential carrier housing or case rotates in unison with one of the drive axles. This locking action, of course, stops the otherwise independent rotation of planetary pinion gears 36, thereby locking the differential.

The differential lock that is utilized in differential mechanism 12 may take the form of dynamic tooth clutch 10 which surrounds a portion of drive axle 18 and an outer portion 46 of differential carrier housing or case 26 and is utilized to couple differential carrier 24 and drive axle 18 for conjoint rotation.

Figure 4:
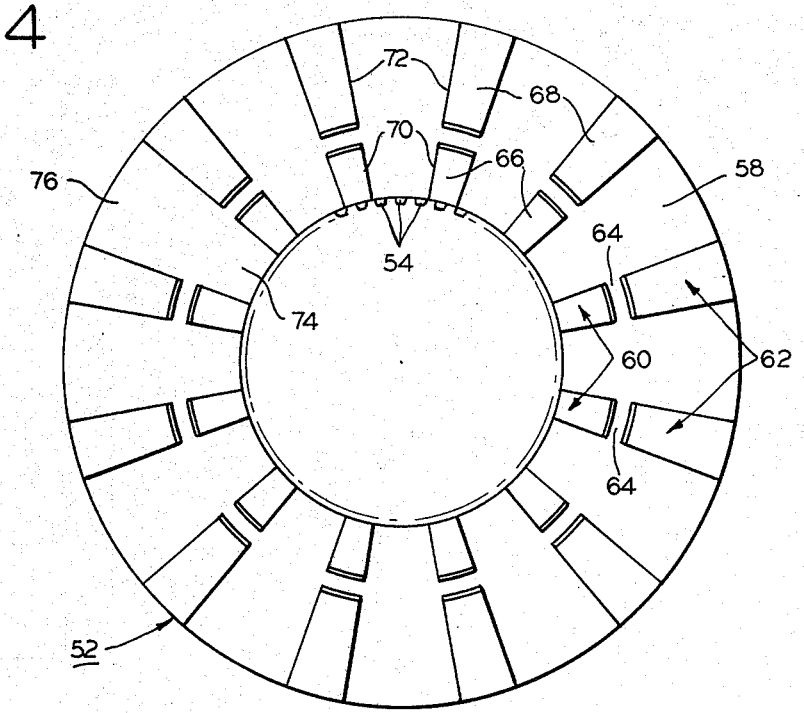
FIG. 4 is a simplified enlarged sectional view taken along line 4 — 4 of FIG. 2 and shows the driven-half portion of the clutch.

As best seen in FIGS. 2 and 4, dynamic tooth clutch 10 includes a shaft or driven-side collar portion 52 which is internally splined as at 54 to splined portion 56 of drive axle 18 so that collar portion 52 rotates with drive axle 18 but is also capable of sliding axial movement with reference thereto. The generally flat front side surface 58 of shaft collar 52 is provided with a plurality of equally spaced axially-extending radial outer teeth 62, with teeth 62 being angularly or radially aligned with, but slightly radially spaced from inner teeth 60, so that aligned inner and outer teeth 60 and 62 respectively, are separated by an intermediate groove 64. Groove 64 has an axial extent from the outer axial end surfaces 66 and 68 of teeth 60 and 62 respectively, to collar flat front surface 58. The axial extent of teeth 60 and 62 is defined by their respective side surfaces 70 and 72, respectively. The angular spaces between teeth 60 are dominated by numeral 76.

Figure 3:
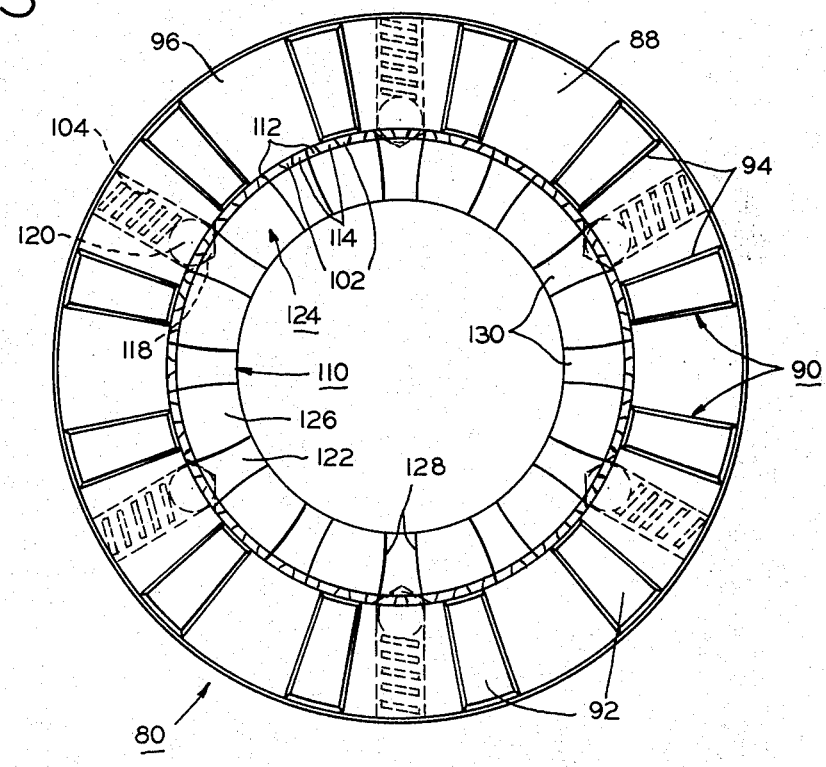
FIG. 3 is a simplified enlarged sectional view taken along line 3 — 3 of FIG. 2 and shows the driving-half portion of the clutch.

As best seen in FIGS. 2 and 3, clutch 10 also includes a case or driving-side collar 80 that is physically secured for rotation by external splines 82 on outer portion 46 of differential carrier housing 26. Splines 82 mate with internal splines 84 of collar 80, with the axial extent 86 of splines 84 being limited to the axial extent of that portion of collar 80 that surrounds carrier housing portion 46.

Driving-side collar 80 has a flat front surface 88 which is provided with a plurality of axially extending radial teeth 90 that are substantially similar in size, location and angular spacing to outer teeth 62 of collar portion 52.

Teeth 90 of collar 80 have outer axial end surfaces 92 and side surfaces 94, with the spaces between teeth 90 being denominated by numeral 96.

The inner peripheral surface of collar 80 between flat front surface 88 and the inner end of splines 84, which has the axial extent denominated by line 98, is provided with a plurality of equally spaced internal splines 102, with splines 102 being axial continuations of every third one of splines 84, thus there are only one-third as many splines 102 as there are splines 84.

Case or driving-side collar 80 is also provided with a plurality, such as six, for example, equally spaced radial bores 104, that extend into collar axial portion 98, i.e., into the area provided with splines 102. The function of radial bores 104 will be discussed in detail hereinafter.

Axial portion 98 of collar 80 also serves to receive a cam ring 110, with cam ring or mechanism 110 having a plurality of equally spaced peripheral or external splines 112, with the axial extent of splines 112 being the same as that of splines 102. The angular space 114 between complementary sides of splines 102 and splines 112 is such that when cam ring 110 is centered relative to splines 102, angular spaces 114 on either side of splines 112 are equal to 5°, so that cam ring 110 is displaceable 5° in both directions from its center position before its splines 112 abuts splines 102 of collar 80. Directly aligned with each radial bore 104 in collar 80, is conical cam surface 118 in the peripheral surface of cam ring 110. Each of bores 104 contains a spring-biased ball detent member 120, with a portion of detent member 120 being received in cam surface 118. The slope of cam surface 118 and the predetermined biasing pressure of detent members 120 are selected so as provide a self-centering action for cam ring 110 with reference to collar 80, so, that as will be explained in more detail later, when cam ring 110 is displaced with reference to collar 80, upon removal of the displacing force, detent members 120 again return cam ring 110 to its center position.

Cam ring 110 also has a flat front surface 122 and a plurality of equally spaced axially extending radial teeth 124, with teeth 124 having an outer axial end surface 126 and tooth side surfaces 128. The number and location of teeth 124 substantially corresponds with those of inner teeth 60 of collar 52. The spaces 130 inbetween teeth 124 correspond to the width of teeth 60 on collar 52, so as to permit the intermeshing of teeth 60 and 124 as will be described in more detail later. As best seen in FIG. 2, the annular flat rear surface of cam ring 110 physically abuts the annular flat outer surface of differential carrier housing portion 46. Cam ring 110 is held in place not only by ball detent members 120 but also by a retainer ring 132 that is preferably press fitted against the radial inner ends of teeth 90 of collar 80, with an annular end surface of retainer ring 132 abutting the outer ends of splines 102 and splines 112. Retainer ring 132 also serves to center cam ring teeth 124 during engagement with collar teeth 60, with retainer ring 132 being received in groove 64 during the engagement of the clutch teeth as will be described in more detail later.

It should be clear at this time that as a result of the intermeshing of splines 84 with splines 82, which are of limited axial extent, collar 80 will rotate with, but is axially affixed to differential carrier housing 26. At the same time, cam ring 80 can be angularly displaced for 5° in both directions from its center position to which it is always urged by preloaded ball detent members 120. It should also be clear that collar 52 rotates with and is axially movable (by virture of intermeshing splines 54 and 56) on drive axle 18.

A rear step portion 136 of collar 52 has a flanged retainer ring 138 affixed thereto which in turn axially engages a flanged end portion 142 of an annular stepped piston member 140. The interaction of retainer ring 138 and piston member 140 permits bidirectional axial movement of collar 52 by piston member 140 while at the same time permitting independent rotational movement of collar 52. Annular piston member 140 is in turn sealingly received within stepped portions 146 and 148 of a stationary cylinder body 144 which also includes a portion 152 that substantially envelopes collar portions 52 and 80. Cylinder end portion 152 is also axially, but not rotatably, connected with collar 80 via several retaining rings 154 of known construction.

Piston member 140 is normally biased to the right, i.e., collar member 52 is biased to a disengaged position, by means of a coil spring member 158 interposed between the outer end of cylinder body 144 and an abutment means 160 attached to the outer end of piston member 140. Spring member 158, in addition to its disengaging-biased function, also acts as a torque reaction member for piston member 140 and keeps it from rotating. Preferably, one end of spring member 140 is attached to abutment means 160 while the other end of spring member 158 is attached to or abuts the outer end of cylinder body 144.

Cylinder body 144 is provided with a fluid pressure inlet port 162 that leads to a variable volume chamber 164 between piston member 140 and cylinder body 144 with the introduction of fluid under pressure into chamber 164 overcoming the bias spring member 158 and causing teeth 60 and 124 as well as teeth 62 and 90 to intermesh in the manner about to be described.

Figure 5:
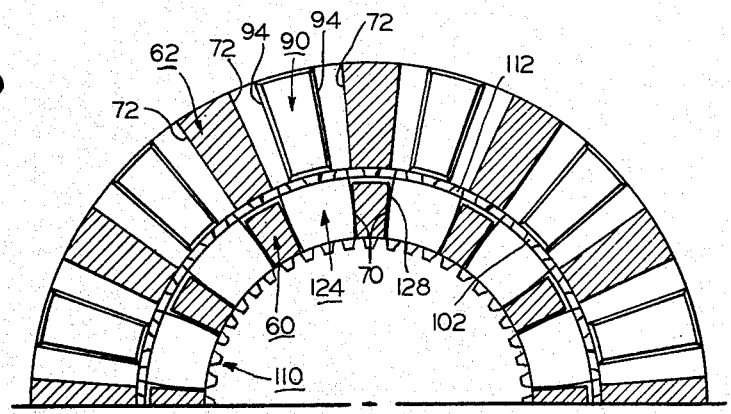
FIG. 5 is a simplified, enlarged, partial sectional view taken along line 5 — 5 of FIG. 2 and shows some of the tooth portions of the clutch in a meshed but prior-to full torque-transmitting position.

As previously noted, spaces 130 (FIG. 3) between cam ring teeth 124 are of such width or angular extent so as to permit the insertion of inner teeth 60 of collar 52, as is shown in FIG. 5, for example. As also previously noted, the location, size and structures of teeth 62 and 90 are substantially similar, therefore the spaces 76 between teeth 60 and spaces 96 between teeth 90 are also substantially similar. The width or angular extent of spaces 76 and 96 are such that when, for example, teeth 90 are centered relative to teeth 62, there can be an angular movement of 5° in either direction before either of side surfaces 94 of each tooth 90 abuts the adjacent or complementary sides 72 of the adjacent teeth 62.

While the tooth depth or axial extent of side surfaces 72 and 94 of teeth 62 and 90 respectively, are substantially the same and one of the remaining side surfaces 70 and 128 of teeth 60 and 124 respectively, is also substantially similar to those of teeth 62 and 90, the tooth depth of the other teeth 60 and 124 is slightly greater. As best seen in FIG. 3, the flat front surface 88 of collar 80, from which teeth 90 extend, is in the same plane as flat front surface 122 of cam ring 110 from which teeth 124 extend. In addition, the tooth depth of teeth 124 is slightly greater, for example, 0.030–0.040 inches greater, than that of teeth 90, so that when collar 52 is axially displaced to the left by means of fluid under pressure acting on piston member 140, and assuming that opposing teeth 124 and 60 are not so angularly aligned as to permit meshing therebetween, then, due to the greater axial extent or tooth depth of teeth 124 (with reference to teeth 90), outer axial end surfaces 66 of teeth 60 and outer axial end surfaces 126 of teeth 124 will abut or contact each other while there is still clearance between outer axial end surfaces 68 of teeth 62 and outer axial end surfaces 92 of teeth 90.

As shown in FIG. 3, in the normal unengaged position of clutch 10, cam ring 110 is in its centered position so that cam ring teeth 124 and collar teeth 90 are radially or angularly aligned. In this position, cam ring 110 and teeth 124 can be angularly displaced 5° in either direction relative to collar 80 and teeth 90, as previously explained.

In operation, when fluid under pressure axially displaces piston member 140 to the left and therefore causes collar 52 to move to the left, the first elements to abut are outer axial end surfaces 126 of teeth 124 and outer axial end surfaces 66 of teeth 60. The amount of spring biasing or preloading of ball detent members 120 is so chosen as to be greater than the force of the fluid pressure that axially translates collar 52 into engagement with collar 80, so that in the absence of direct intermeshing, the abutment of end surfaces 66 and 126, while causing a certain rubbing action or rubbing friction therebetween, does not cause or permit the angular displacement of cam ring 110 with reference to collar 80. Since teeth 60 have the rotational speed of drive axle 18, and teeth 124 have the rotational speed of differential carrier housing 26, and since these rotational speeds may differ, the sliding action between surfaces 66 and 124 continues until they no longer abut, i.e., until teeth 60 come into the engagement with teeth 124. The moment of engagement between teeth 60 and 124 is illustrated in FIG. 5 and shows that at this time teeth 124 of cam ring 110 are still angularly aligned with teeth 90, i.e., that cam ring 110 is still centered with reference to collar 80. FIG. 5 also shows that at this time teeth 62 have entered surfaces or spaces 96 between teeth 90 and, it should be understood of course that conversely, teeth 90 have entered spaces 76 between teeth 72. In addition, FIG. 5 shows that although teeth 62 have entered spaces 96 between teeth 90, teeth 62 are centered in spaces 96. Thus, at this time, there is no touching or abutting of sides 72 and 94 of teeth 62 and 90, respectively.

Figure 6:
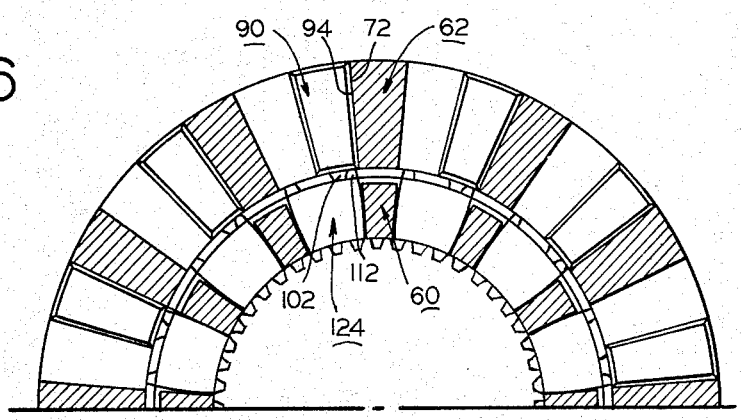
FIG. 6 is a view similar to that of FIG. 5 but showing the clutch teeth in full intermeshing and full torque-transmitting position.

Since, during the engagement of the teeth of collars 52 and 80, some torque is being transferred and since there generally is a difference in rotational speed between drive axle 18 and differential carrier housing 26, and since cam ring teeth 124 and collar teeth 60 are now engaged, cam ring 110 will be angularly displaced from its centered position because the amount of torque being transferred exceeds the spring biasing force exerted on ball detent members 120. Full torque, of course, is not transmitted upon the engagement of collar inner teeth 60 and cam ring teeth 124 (FIG. 5), but this engagement also permits the complete entering of teeth 62 into spaces 96 between teeth 90 and the entering of teeth 90 between spaces 76 of teeth 62. Once there is engagement between teeth 60 and 124, the accompanying torque transfer displaces cam ring 110 from its centered position and causes contact between side surfaces 72 and 94 of teeth 62 and 90, respectively. Thus, basically, cam ring 110 acts as a synchronizer since it permits teeth 90 to fully axially enter the spaces 76 between teeth 72 and teeth 62 to fully axially enter the spaces 96 between teeth 90 before there is abutment between tooth side surfaces 72 and 94. Therefore, cam ring 110 behaves as a synchronizer since its displacement allows teeth 62 and 90 to fully axially intermesh before they make contact between their side surfaces 72 and 94. FIG. 6 shows the displacement of cam ring teeth 124 relative to teeth 90 as well as the abutment of one of the side surfaces 94 of each of teeth 90 with one of the side surfaces 72 of each of teeth 62. The full abutment of surface 94 with surface 72 prior to full torque transfer of course minimizes the shock loading therebetween. If there were but a partial axial engagement between teeth 90 and 62, extremely high tooth and shock loadings as well as possible tooth shear would result.

The 5° angular displacement of cam ring 110 with reference to collar 80 permits engagement between collars 80 and 52 even under dynamic conditions, e.g., when differential mechanism 12 is operating, with engagement between the teeth of collars 52 and 80 being possible up to an about 200 rpm different rotational speed between drive axle 18 and differential housing 26.

It should of course be understood that, if desired, dynamic tooth clutches, such as clutch 10, could be designed for engagement even in excess of the previously-mentioned 200 rpm differential speed between the driving and the driven members. This, of course, would entail the use of larger and heavier collars as well as greater than 5° bidirectional angular movements of the cam ring in order to permit the required full axial engagement of the collar teeth. Furthermore, the collar tooth construction would have to be more robust in order to absorb the additional shock loading. In addition, it should be understood, that while collars 52 and 80 are denominated as driven and driving collars, respectively, their position and/or function could be reversed.

FIG. 7, which is a simplified diagrammatic view that illustrates fluidic circuit and control means that could be utilized for the operation of dynamic clutch piston member 140 within cylinder body 144, shows a source of high pressure fluid 170 connected, via conduit 172, to a control valve 174, which in turn is connected, via conduit 176, to any desired type of a known differential speed sensing mechanism 178 that senses the difference in speed between axle shaft 18 and differential carrier housing 26. Control valve 174 is connected, via conduit 180, with an operator-controlled three-way valve 182, with valve 182 also being connected, via conduit 184, with reservoir 186 and via conduit 188, with clutch cylinder body 144.

In one position, valve 182 permits no fluid communication between source 170 and either reservoir 186 or cylinder 144. In its second position, valve 182 permits fluid communication between source 170 and cylinder body 144. whereas in its third position, valve 182 permits a fluid connection only between cylinder body 144 and reservoir 186. It should be understood, of course, that speed sensing mechanism 178 together with valve 174 can interrupt the communication between source 170 and valve 182 any time the speed differential between shaft 18 and housing 26 exceeds a predetermined amount, such as for example 200 rpm, regardless of the movement of valve 182 by the operator. If desired, in the case of multiple-speed transmissions, the source of fluid under pressure may be the transmission pressure port of, for example, the first and second speed ranges, and valve 174 and differential speed sensing mechanism 178 may be deleted altogether.

Obviously, while the invention has been described in relation to only one embodiment, numerous variations, changes, substitutions and equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. A dynamic tooth clutch interposed between a rotatable first member operating at a first speed and a rotatable second member operating at a second speed, said clutch comprising:
   a. a first collar slidably mounted on one of said members, said first collar having, on one end, a plurality of equally angularly spaced axially extending radial first outer teeth, said first outer teeth being angularly aligned with a plurality of equally angularly spaced axially extending radial first inner teeth;
   b. a second collar fixed to the other of said members, said second collar having, on one end facing said first collar one end, a plurality of equally angularly spaced axially extending radial second outer teeth substantially similar in size, location and angular spacing to said first outer teeth, said first and second outer teeth being arranged to intermesh and being so angularly spaced that, upon initial intermeshing, when said first outer teeth are centered relative to said second outer teeth, there can be a first predetermined amount of bidirectional angular rotational movement therebetween before either of the side surfaces of one of said first or second outer teeth abut the adjacent side surfaces of the other of said first or second outer teeth;
   c. a cam ring confined between an inner peripheral surface of said second collar and an end surface of the other of said members;
   d. complementary retaining means on the inner peripheral surface of said second collar and the outer peripheral surface of said cam ring permitting a second predetermined amount of bidirectional angular rotational movement of said cam ring relative to said second collar;
   e. preloaded and self-centering yieldable means for centering said cam ring relative to said second collar and returning said cam ring to a center position, relative to said second collar, when said first and second outer teeth are disengaged;
   f. a plurality of equally spaced axially extending second inner teeth on said cam ring, said second inner teeth being angularly aligned with said second outer teeth when said cam ring is centered relative to said second collar, said second inner teeth being substantially similar in location and angular spacing to said first inner teeth, said first and second inner teeth being arranged to directly intermesh, with the combined tooth depth or axial extent of the side surfaces of said pluralities of said first and second inner teeth being greater than the combined tooth depth or axial extent of the side surfaces of said pluralities of said first and second outer teeth, so that, when said first collar is axially displaced toward said second collar, if said first and second inner teeth are not so angularly aligned as to permit meshing therebetween, the opposing axial end surfaces of said first and second inner teeth will abut while there still is clearance between the opposing axial end surfaces of said first and second outer teeth; and
   g. means for axially displacing said first collar relative to said second collar, with the force for displacing said first collar toward said second collar being less than that of said preloaded self-centering yieldable means, thus permitting direct meshing of said first and second inner teeth and complete centered intermeshing of said first and second outer teeth, prior to the angular displacement of said cam ring relative to said second collar, thereby allowing full axial intermeshing of said first and second outer teeth before there is abutment and subsequent torque transfer between either of the side surfaces of one of said first or second outer teeth with the adjacent side surfaces of the other of said first or second outer teeth, with said angular displacement of said cam ring permitting substantially shock free coupling of said first and second members up to a predetermined defference between said first and second speeds.

2. The dynamic tooth clutch of claim 1 wherein said first outer and inner teeth are separated by an intermediate segmented annular first groove, said second outer and inner teeth are separated by an intermediate segmented annular second groove, and said clutch further includes a cam ring retainer ring press fitted into said second groove into axial end abutment with said complementary retaining means, with at least a portion of said retainer ring being received in said first groove upon the meshing of said first outer and inner teeth with said second outer and inner teeth respectively.

3. The dynamic tooth clutch of claim 1 wherein said first and second predetermined amounts of bidirectional angular movement are about 5°.

4. The dynamic tooth clutch of claim 1 wherein said predetermined difference between said first and second speeds is up to about 200 rpm.

5. The dynamic tooth clutch in claim 1 wherein one of said members is an axle shaft and the other of said members is a differential carrier.

6. The dynamic tooth clutch of claim 1 wherein said complementary retaining means includes a plurality of equally spaced first splines on the inner peripheral surface of said second collar and a plurality of equally spaced second splines on the outer peripheral surface of said cam ring, said splines being arranged to intermesh and being so angularly spaced that when said cam ring is centered relative to said second collar there can be about 5° bidirectional angular rotational movement therebetween.

7. The dynamic tooth clutch of claim 1 wherein said preloaded and self-centering yieldable means includes a plurality of equally spaced spring-biased ball detent members contained in radial bores in said second collar, with a portion of said ball detent members being received in aligned conical cam surfaces on the peripheral outer surface of said cam ring.

8. The dynamic tooth clutch of claim 1 wherein said means for axially displacing said first collar relative to said second collar, includes a fluid-pressure operated piston and cylinder means, with one of said piston and cylinder means being non-rotatably connected to said second collar and the other of said piston and cylinder means being non-rotatably connected to said first collar.

9. The dynamic tooth clutch of claim 8 further including means for controlling said means for axially displacing said first collar relative to said second collar, said means for controlling including a source of fluid pressure, and a manually-controlled multi-position valve means fluidically interposed between said piston and cylinder means and said source of fluid pressure.

10. The dynamic tooth clutch of claim 9 further including speed differential sensing means for sensing the difference in speed between said members, said sensing means being connected to a control valve operatively interposed between said multi-position valve and said source of fluid pressure for automatically shutting off said source of fluid pressure any time the speed differential between said members exceeds a predetermined amount, regardless of the position of said multi-position valve.

11. The dynamic tooth clutch of claim 10 wherein said predetermined amount of said speed differential is about 200 rpm.

12. A dynamic tooth clutch for coupling a first rotating member, operating at a first speed, to a second rotating member, operating at a second speed different from said first speed, so that both members operate at one of said first or second speeds, said dynamic tooth clutch comprising in combination:
 a. a first collar rotatably secured to but axially movable on one of said members, said first collar having, on one end, a plurality of equally angularly spaced axially extending radial first outer teeth, said first outer teeth being angularly aligned with a plurality of equally spaced axially extending radial first inner teeth;
 b. a second collar axially and rotatably affixed to the other of said members, said second collar having, on an end facing said first collar one end, a plurality of equally angularly spaced axially extending radial second outer teeth, said second outer teeth being substantially similar in size, location and angular spacing to said first outer teeth, said first and second outer teeth being arranged to intermesh and being so angularly spaced that, upon initial interpositioning, when said first and second outer teeth are centered relative to one another, the opposing side surfaces of said first and second outer teeth are separated a predetermined angular amount;
 c. a cam mechanism axially confined in an inner peripheral surface and yieldingly angularly self-centered and retained relative to said second collar so as to permit a predetermined amount of angular movement relative to said second collar, with said amount of angular movement being similar to the predetermined angular amount separating the opposing side surfaces of said first and second outer teeth;
 d. said cam mechanism having a plurality of equally spaced axially extending second inner teeth, said second inner teeth being angularly aligned with said second outer teeth when said cam mechanism is centered relative to said second collar, said second inner teeth being substantially similar in location and angular spacing to said first inner teeth, with said first and second inner teeth being arranged to intermesh;
 e. the combined tooth depth of said first and second inner teeth is greater than the combined tooth depth of said first and second outer teeth so that when said first collar is axially displaced toward said second collar the opposing end surfaces of said first and second inner teeth will abut while there still is clearance between the opposing axial end surfaces of said first and second outer teeth; and
 f. means for axially displacing said first collar relative to said second collar with the force for displacing said first collar toward said second collar being less than the self-centering force of said cam mechanism thus permitting complete axial centered intermeshing of said first and second outer teeth prior to the displacement of said cam mechanism relative to said second collar due to the difference between said first and second speeds, with the angular displacement of said cam mechanism thereby permitting full intermeshing of said first and second outer teeth before there is abutment and subsequent torque transfer between either of the side surfaces of said first or second outer teeth with adjoining side surfaces of the other of said first or second outer teeth.

13. The dynamic tooth clutch of claim 12 wherein said predetermined amount of angular movement is about 5°.

14. The dynamic tooth clutch of claim 13 wherein the difference between said first and second speeds is less than 200 rpm.

15. The dynamic tooth clutch of claim 12 wherein one of said members is an axle shaft and the other of said members is a differential carrier.

16. A differential lock structure for a differential mechanism including an input shaft, a differential carrier driven by said input shaft, axle shaft received within said differential carrier and having beveled gears meshing with beveled gears mounted on a cross within said carrier to provide a differential rotation between said axle shafts, said differential lock structure comprising:
 a. a first collar rotatably secured to but axially slidable on one of said axle shafts, said first collar having, on one end, a plurality of equally angularly spaced axially extending radial first outer teeth, said first outer teeth being angularly aligned with a plurality of equally spaced axially extending radial first inner teeth;
 b. a second collar affixed to said differential carrier, said second collar having, on an end facing said first collar one end, a plurality of equally angularly spaced axially extending radial second outer teeth substantially similar in size, location and angular spacing to said first outer teeth, said first and second outer teeth being arranged to intermesh and being so angularly spaced that, upon initial intermeshing, when said first outer teeth are centered relative to said second outer teeth, there is a first predetermined amount of bidirectional angular spacing between the opposing side surfaces of said first and second outer teeth;
 c. a cam ring confined between an annular end surface of said differential carrier and an inner peripheral surface of said second collar, with the inner peripheral surface of said second collar and the outer peripheral surface of said cam ring being provided with complementary retaining means to permit a predetermined amount of bidirectional angular rotational movement of said cam ring relative to said second collar, said second collar and said cam ring being provided with preloaded and self-centering yieldable means for centering said cam ring relative to said second collar and returning said cam ring to a center position, relative to said second collar, when said first and second outer teeth are disengaged;
 d. a plurality of equally spaced axially extending second liner teeth on said cam ring angularly alinged with said second outer teeth when said cam ring is centered relative to said second collar, with said second inner teeth being substantially similar in location and angular spacing to said first inner teeth, with said first and second inner teeth being arranged to intermesh;

e. the combined tooth depth of said first and second inner teeth being greater than the combined tooth depth of said first and second outer teeth so that when said first collar is axially displaced toward said second collar, in the absence of intermeshing, there is axial end abutment between said first and second inner teeth while there is still clearance between the axial end surfaces of said first and second outer teeth; and, f. means for axially displacing said first collar relative to said second collar, with the force for displacing said first collar toward the second collar being less than that of said preloaded self-centering means thus permitting centered intermeshing of said first and second outer teeth prior to the angular displacement of said cam ring relative to the said second collar, with the angular displacement of said cam ring permitting full axial intermeshing of said first and second outer teeth prior to the abutment and subsequent torque transfer between either of the side surfaces of one of said first or second outer teeth with the adjacent side surfaces of the other of said first or second outer teeth, said differential lock structure permitting the coupling of said differential carrier to said axle shaft for conjoint rotation therewith, said coupling action permitting the coupling of said axle shaft and said differential carrier as long as the speed differential therebetween does not exceed a predetermined amount.

17. The differential lock structure of claim 16 wherein said predetermined amount of bidirectional angular spacing and said predetermined amount of bidirectional angular rotational movement are about 5°.

18. The differential lock mechanism of claim 17 wherein the amount of rotational speed difference between said axle shaft and said differential carrier is limited to about 200 rpm.

19. The differential lock structure of claim 16 wherein said means for axially displacing said first collar relative to said second collar includes a fluid-pressure operated piston and cylinder means, with one of said piston and cylinder means being non-rotatably connected to said second collar and the other of said piston and cylinder means being non-rotatably connected to said first collar.

20. The differential lock structure of claim 19 further including means for controlling said means for axially displacing said first collar relative to said second collar, said means for controlling including a source of fluid pressure and a manually-controlled multi-position valve means fluidically interposed between said piston and cylinder means and said source of fluid pressure.

21. The differential lock structure of claim 20 further including speed differential sensing means for sensing the difference in speed between said axle sahft and said differential carrier, said sensing means being connected to a control valve operatively interposed between said multi-position valve and said source of fluid pressure for automatically shutting off said source of fluid pressure any time the speed differential between said axle shaft and differential carrier exceeds about 200 rpm, regardless of the position of said multi-position valve.

* * * * *